United States Patent [19]

Jones

[11] 4,109,810
[45] Aug. 29, 1978

[54] APPARATUS FOR MOUNTING AND DEMOUNTING A VEHICLE BODY

[76] Inventor: Eldon D. Jones, R.R. 2, Lake Crystal, Minn. 56055

[21] Appl. No.: 795,981

[22] Filed: May 11, 1977

[51] Int. Cl.² ............................................. B60P 1/28
[52] U.S. Cl. ................................... 214/505; 214/517; 254/189; 296/35 A
[58] Field of Search .............. 214/505, 506, 515, 516, 214/517; 296/35 A; 254/189

[56] References Cited

U.S. PATENT DOCUMENTS

| 2,223,275 | 11/1940 | Valenzuela | 296/35 A X |
|---|---|---|---|
| 3,049,378 | 8/1962 | Nelson | 214/517 X |
| 3,078,075 | 2/1963 | Richter | 254/189 |
| 3,485,400 | 12/1969 | Pewthers | 214/505 |
| 3,490,626 | 1/1970 | Kirk | 214/84 |
| 3,897,882 | 8/1975 | Budoff | 214/517 |
| 3,964,626 | 6/1976 | Arregui | 214/505 |
| 4,010,826 | 3/1977 | Jones | 254/189 X |

Primary Examiner—Albert J. Makay
Attorney, Agent, or Firm—Geoffrey R. Myers

[57] ABSTRACT

Apparatus for changing bodies on a vehicle includes a long beam platform pivotally connected at its rearward end to that of the vehicle chassis, a hoist to pivot the platform and a pair of hydraulic cylinder winches having a set of multiwrap sheaves at either end and mounted to both sides of the platform. The sheaves are multiwrapped with a cable secured at one end and securable to the truck body at the other end. The cylinders extend in the direction of loading to maximize travel efficiency and eliminate the need for an idler sheave. Retractable locking means are provided on the platform for locking the body into place. By operation of the hoist and winches, the vehicle body may be quickly and safely mounted onto or demounted from the platform whether loaded or unloaded.

29 Claims, 3 Drawing Figures

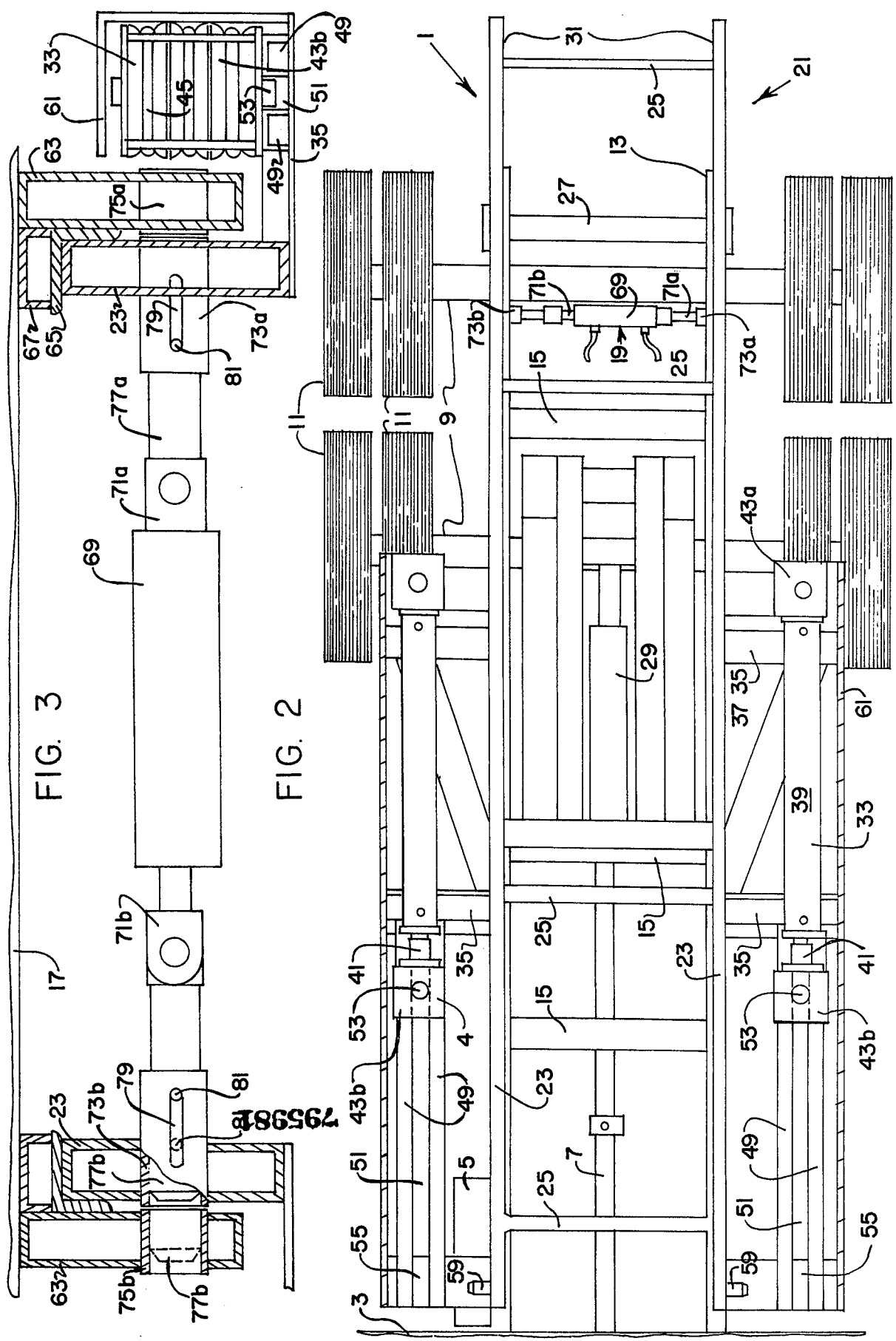

APPARATUS FOR MOUNTING AND DEMOUNTING A VEHICLE BODY

This invention relates to apparatus for changing vehicle bodies. More particularly, this invention relates to apparatus connectable to the chassis of a vehicle for easily mounting a body on or demounting a body from the chassis.

Trucks, except for certain light weight types, are generally not mass-produced by assembly line techniques. Rather, each truck is usually custom built by a final stage manufacturer who mounts the body to the chassis and adds various customizing features to the finished product at the customer's request. Because of this, the customer often has the opportunity to choose from a wide variety of body styles, shapes and sizes and from a wide variety of chassis-cab models which are mass produced by large relatively centralized corporations using assembly line techniques. The mass-produced chassis is comprised of a cab, longitudinal side frame members extending from behind the cab, engine and axles. Although the chassis (i.e., chassis-cab) is only one component of the finished vehicle, it usually constitutes the major expense in the overall cost.

The efficacy of being able to use multiple bodies with a single chassis is well known. For example, in agriculture, the ability to be filling one or more grain or other produce bodies in the field while a filled body is being hauled to the storage facilities by the chassis, obviously reduces the number of chassis that are needed, and thus maximizes profits. In addition, many agricultural or other industrial operations are multifaceted. Thus, for example, the ability to easily and rapidly mount and demount a body onto and from a chassis means that the vehicle can be quickly converted from a grain or produce hauler, into a flat bed, live stock rack, van body or machinery platform, etc., without the expense and/or loss of time normally resulting from having to take the truck into the shop for conversion, or the need to purchase a chassis for each body style desired.

One of the most significant problems faced in designing any mounting apparatus that is to be a part of the finished vehicle is adequate strength. While empty bodies are usually relatively light, when loaded these bodies often carry several tons. Because of the manner in which chassis are designed, there is usually little excess space within which to locate the mounting apparatus. Thus, the equipment employed must be strong, efficient and yet capable of being installed within the available space.

Another problem attendant the design of any such mounting apparatus is one of safety, particularly highway safety. First and foremost the body, while readily portable, must be securely locked into place when being hauled by the chassis.

In addition to highway safety, there is also, of course, the need to insure the safety of the operator during mounting and demounting. Uncontrolled and exposed draw cables, particularly when used with drum winches or centrally extending cylinder winches currently employed in known devices by loading equipment can present a significant safety problem if the cables snap or come loose during the mounting or demounting operations. This hazard becomes particularly acute when mounting or demounting a heavily loaded body as contemplated by this invention.

Yet another problem attendant the art is the need to obtain travel efficiency. Any devices employed must be able to move a minimum distance which results in a maximum unloading or loading distance affect. While related to the space and strength problem heretofore discussed, this also becomes a part of the economic problem, i.e., the mandate that the system not be so complex as to be too expensive or too unreliable for its intended purpose.

From the above it can be seen that there exists a need in the art for a mechanism which can easily and quickly mount or demount a body onto or from a chassis and yet which is safe, effective, reliable, and economic, but which does not consume undue space and securely locks the body to the chassis. It is the purpose of this invention to fulfill this and other needs apparent to the skilled artisan once given the following detailed description of the invention.

Generally speaking, this invention fulfills the abovedescribed needs and eliminates the aforesaid problems by providing an apparatus for mounting or demounting a vehicle body onto or from a vehicle chassis which comprises a platform for supporting the body, means for pivotally connecting the platform to the vehicle chassis, means for rotating the platform about the pivotal connection means, a winch means for controllably moving the body off of or onto the platform, and means for securing the body to the platform, the winch means comprising a pair of hydraulic cylinder winches having at either end a multiwrap set of sheaves and a cable multiwrapped about the sheaves, one end of the cable being secured and the other end being attached to means for removably securing it to the body.

In certain preferred embodiments of this invention the pivot means is a hoist and both winch and hoist are hydraulically operated. In further of these embodiments the platform is comprised of two longitudinal slide beams pivotally attached to the two longitudinal side chassis frame members and spaced so as to align in sliding fashion with attachments to the long sills of the body. In such embodiments there is preferably provided a multiwrap hydraulic winch attached to each of the longitudinal slide beams and covered in a manner to minimize cable exposure. In addition the hydraulic cylinders are located to elongate in the direction in which the body is drawn onto the platform, thus maximizing travel efficiency and eliminating the need for an idler sheave. Guide means are preferably provided for the hydraulic cylinder sheaves during the extending operation, thereby to maximize the efficiency and safety of the mounting or demounting operation. In other preferred embodiments the means for securing the body to the platform are retractable hydraulically operated locking means which, when locked, insure that the body is safely secured to the vehicle chassis when it is hauling the body or during a dumping operation. The apparatus of this invention finds particular utility in the truck art and more particularly in the heavy-duty truck art.

This invention will now be described with respect to certain embodiments thereof as illustrated in the accompanying drawings wherein:

IN THE DRAWINGS

FIG. 2 is a top plan view of the embodiment of FIG. 1.

FIG. 3 is a front plan partially sectionalized view of an embodiment of the locking mechanism of this invention.

Figure 1:
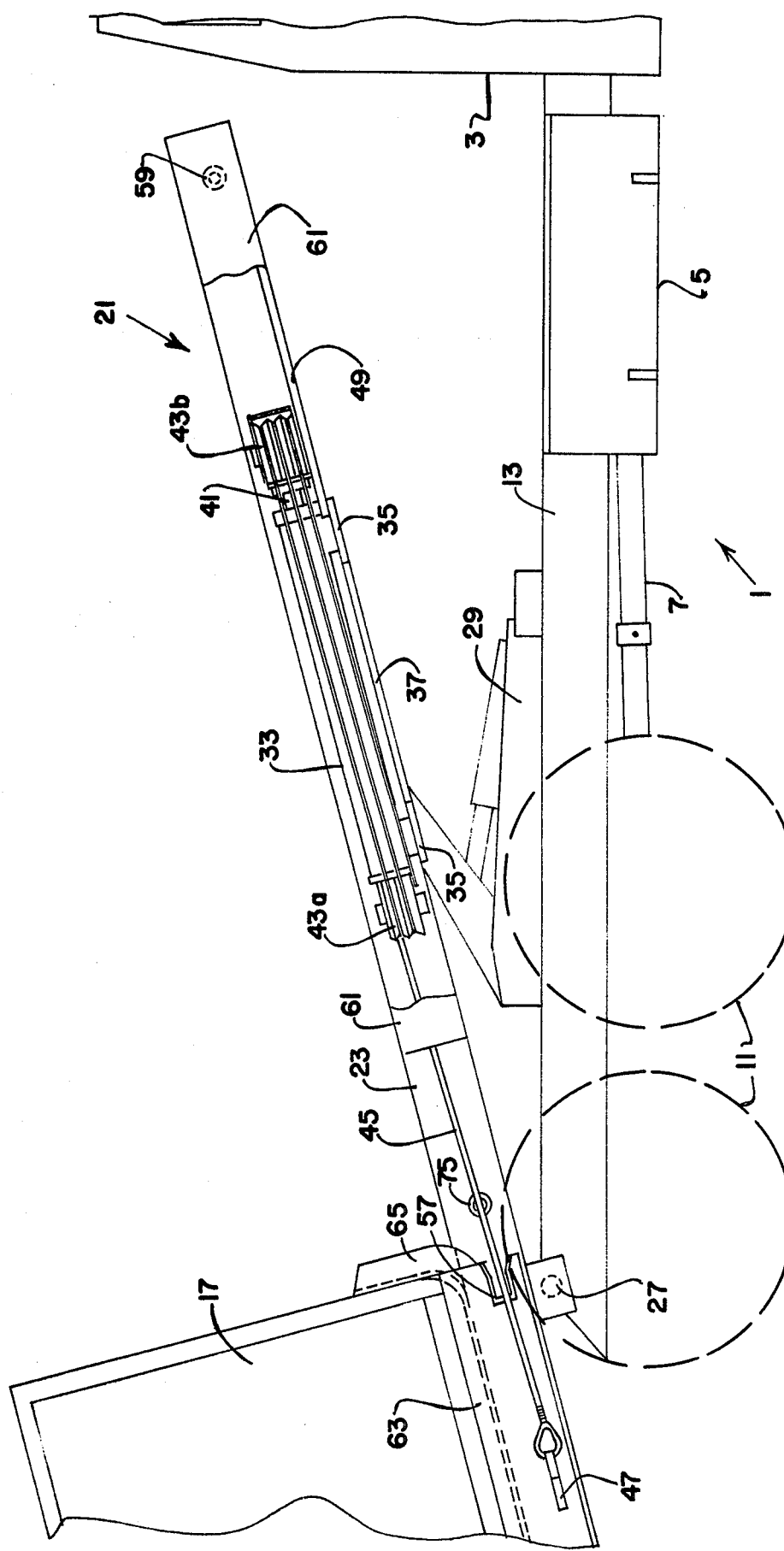
FIG. 1 is a side plan, partial cutaway view of one embodiment of this invention.

With reference to the drawings, there is illustrated a typical truck chassis 1 conventionally equipped with a cab 3, side tanks or tool box 5, drive shaft 7, a tandem rear axle assembly 9, dual wheels 11, a pair of longitudinally extending frame members 13 and reinforcing cross members 15.

Attached to chassis 1 is an apparatus in accordance with this invention for safely and effectively mounting and demounting body 17 onto and from chassis 1 regardless of whether body 17 is loaded or unloaded. As illustrated best in FIG. 3 and as more fully discussed hereinafter, the apparatus also includes a means 19 for securing body 17 in place during hauling and/or dumping.

The apparatus illustrated generally includes a platform 21 comprised of a pair of longitudinally extending slide beams 23 and reinforcing cross beams 25. Platform 21 is pivotally connected to chassis frame members 13 by pivot pin (and shaft) connection 27. Platform 21 is pivoted about connection 27 by a hoist 29.

Hoist 29 may be of any conventional design. For the purposes of this invention, hydraulic hoists of the power-up/power-down type are preferred. Such hoists are operated by conventional hydraulic systems (not shown for convenience) whose hydraulics are pressurized either from a conventional power take-off device associated with the transmission or by a separate unit. A preferred example of a hydraulic hoist readily adaptable for use with the illustrated apparatus is a LO-BOY hoist manufactured by Crysteel Mfg., Inc., of Lake Crystal, Minn.

Longitudinal beams 23 extend rearwardly of chassis frame member 13 a distance sufficient so that when hoist 29 is fully extended to give pivot platform 21 its maximum degree of rotation (e.g., about 60° from the horizontal), the rearward ends 31 of beams 23 are only a few inches off the ground. This facilitates primarily the mounting operation. Beams 23 are preferably tubular and rectangular in cross-section and have attached to their outboard sides hydraulic cylinder winches 33. This may be accomplished by any convenient technique such as the support technique as illustrated. Such a support includes a pair of lateral plates 35 and a diagonal plate 37.

The hydraulic cylinder winches 33 may be of any conventional design. For the purposes of this invention their design is arranged to maximize travel efficiency. Thus, while such winches are conventionally comprised of a hydraulic cylinder 39, a shaft and cross-head 41 and a pair of sheaves 43a and 43b, sheaves 43 are specifically designed to take the necessary number of wraps of cables 45 to provide sufficient length of travel for effective operation. In addition, cable 45 is connected to winch 33 at a stationary anchor and winch 33 is directed so that cylinder shaft 41 extends in the direction of mounting. Thus, by providing sheaves 43b with one or more wraps than sheaves 43a, travel efficiency is maximized. Also the usual need for an idler sheave is eliminated, since all sheaves become working sheaves.

While this configuration may be varied and redirected to meet particular situations, it is found that for most purposes mounting a loaded body 17 will require the most power and that for most purposes at least two wraps of sheave 43a and at least three of 43b provide the necessary efficiency for rapid, yet safe, mounting (e.g., 20 ft. of cable travel for 40 inches of cylinder stroke). In addition, by commencing the wrapping of cable 45 on the outboard side of its connection and providing the requisite number of wraps (e.g., two on 43a, three on 43b), a significant portion of the final length of cable 45 extending to hook 47 on body 17 resides between winch 33 and beam 23, thus serving as a shield if breakage during operation should occur and as a control guide for assuring proper aligning of body 17 with beams 23.

During operation, hydraulic cylinder shafts 41 are held in line by slide bars 49 which form grooves 51 in which sheave axis pins 53 reside. Plates 55 support the ends of slide bars 49. Cylinder shaft 41 extends a distance sufficient to bring body locking groove 57 and stop pin 59 together. As an additional safety feature there is provided an "L" beam 61 which extends around the winch assembly 33 along a substantial portion of the length of beams 23. Not only does beam 61 inhibit the whip action of cable 45 should it break during the mounting or demounting operation, but it also serves to protect the winch assembly from foreign objects such as stones, mud, etc.

In order to facilitate mounting and demounting, body 17 is provided with a means for aligning it with beams 23 and readily moving it therealong. While beam 23 may be provided with rollers or other expensive apparatus, in the embodiment shown, beam 23 is a single, yet effective slide beam upon which body 17 slides during mounting or demounting.

The means on body 17 for aligning it with beams 23 generally comprise an "L"-shaped slide plate 65 and an elevating "C" beam 67 connected to the inboard side of long sill 63. The thickness of the vertical leg of plate 65 provides the necessary close but adequate spacing between platform beam 23 and its adjacent body sill 63 while the depth of the cavity in beam 67 provides the necessary elevation to the lower horizontal wall of sill 63 so as not to interfere with any of the winch platform structures. Plate 65 emerges from the forward end of body 17 and is curved upward, thereby to provide a starting runway for initiation of the mounting operation. While not always necessary, either or both of the proximal surfaces during sliding of beams 23 and plates 65 may be greased or otherwise lubricated for better sliding action, where beam 23 is a simple sliding beam.

It is important that body 17 be tightly locked into place once it is mounted on platform 21. This is not only important for safety during hauling but at times body 17 may be a dump body, i.e., unloadable by raising hoist 29 and dumping the contents from the rear of body 17. While pins 59 and cables 45 provide a modicum of securing ability, it is preferred to have additional means for achieving a true locking function as well. In this regard, such means must not only be effective, but should preferably be easily and automatically engaged or retracted, so as to interfere as little as possible with the mounting and demounting process. Securing means 19, as illustrated in detail in FIG. 3, fulfills this need.

Securing means 19 is comprised of a double acting, floating hydraulic cylinder 69 having an extendible-retractable shaft and yoke 71a and 71b. Yokes 71a and 71b are aligned with hollow tubes 73a and 73b respectively, located in and extending through beams 23. Long sills 63 have extending therethrough hollow tubes 75a and 75b of similar interior diameter as tubes 73a and 73b. Tubes 75a and 75b are brought into alignment with tubes 73a and 73b when body 17 is fully mounted on platform 21. Yokes 71a and 71b are connected to locking heads 77a and 77b which, as illustrated in the cutaway left hand side of FIG. 3, slidably reside in tubes 73a and 73b when in unlocked position, and which upon actuation to lock body 17 into place, extend into tubes 75a and 75b (dotted line). Slide grooves 79 are provided in tubes 73a and 73b, and pins 81 are provided in heads 77a and 77b. Pins 81 reside in their respective grooves 79 thus to form stop limits upon the distance of extension and retraction of yokes 71a and 71b. Generally, the outboard ends of grooves 79 should be such that pins 81 contact them just before heads 77a and 77b emerge from tubes 75a and 75b respectively.

Means 19 may be actuated by any conventional hydraulic system. As stated above it is preferred that the cylinder 69 be of the floating type such that for example yoke 71b would first be actuated, and when it hits its stop limit (as when pin 81 contacts the outboard end of groove 79), yoke 71a is actuated. The hydraulics of such a system are conventional and may be automatically operated from any convenient and safe control location. The power for the hydraulics may be obtained from the same source as used for hoist 29 and/or winches 33 or from a separate source. A conventional power take-off device associated with the truck's transmission in a known manner is a convenient technique for obtaining the necessary power.

OPERATION

The illustrated device may be operated to easily and safely mount or demount a body 17 with respect to chassis 1. FIG. 1 illustrates the device, chassis 1 and body 17 in a partially mounting or demounting posture. A description of an advantageous mounting technique is as follows:

Assume a loaded grain body 17 is resting in a field awaiting to be picked up and hauled to the granary. Body 17 is equipped with the illustrated long sills 63 and slide plates 65 elevated to the appropriate height by "C" beams 67.

Empty chassis 1 having attached thereto the mounting apparatus as illustrated is aligned just ahead of body 17 with hoist 29 in fully raised position. In this position ends 31 of beams 23 are substantially aligned with their respective slide plates 65 attached to body sills 63. Extendable cylinder shafts 41 are in their most retracted position, and cables 45 are now connected to hooks 47 on either side of sills 63.

With the chassis (truck) in neutral and without holding the brakes, the hydraulics of winches 33 are actuated to extend cylinder shafts 41 thus tightening cables 45 and pulling chassis 1 backward until ends 31 of beams 23 contact the curved upward portion of slide plates 65.

Continued extension of cylinder shafts 41 causes body 17 to slide upward onto beams 23 of platform 21. As this occurs hoist 29 is powered downward helping to lift body 17 from the ground. (This is the position shown in FIG. 1). When the front of body 17 is about as high as frame 13, hoist 29 is again powered until the angle of beams 23 and sills 63 are the same. (During tne entire process the angle usually will not exceed 18°).

At this point winch 33 is further actuated to bring body 17 aboard, allowing chassis 1 to roll back freely under body 17 until the rear of body 17 leaves the ground. As body 17 nears the front of platform 21, hoist 29 is powered down all the way, and body 17 is further winched aboard until locking grooves 57 engage pins 59. At this point tubes 73 and 75 are aligned and by actuation of the hydraulics in cylinder 69 yokes 71 are extended into tubes 75, securely locking body 17 to chassis 1.

After plugging in the required electrical wiring for lights, etc. (not shown), the grain-filled body may be safely hauled to the granary, while other bodies remain in the field to be filled. Typical mounting time elapsed is about ten minutes. In the mounted and locked position the body and chassis may be operated as any conventional body-hoist-chassis combination including dumping the grain from a rear door of body 17 after raising the hoist in a conventional dumping technique.

Once returned to the field, the now empty body 17 may be readily demounted from chassis 1 for reloading and the pick up of another loaded or different type of body by following the following simple procedure:

Firstly, the hydraulics of locking cylinder 69 are actuated to withdraw both heads 77a and 77b from their respective body tubes 75a and 75b. Hoist 29 is then actuated and raised to about a 20° angle. The hydraulics of winch cylinders 39 are then actuated to retract shafts 41 until the rear of body 17 is on the ground. Then in a simultaneous operation, more of cables 45 is let out while chassis 1 is eased forward and hoist 29 is raised to its fully elevated position. With body 17 now completely at rest on the ground, cables 45 may be removed from hooks 47. The wiring sockets (not shown) will have unhooked themselves automatically.

Once given the above description many other features, modifications and improvements will become apparent to the skilled artisan. Such other features, modifications, and improvements are, therefore, considered to be a part of this invention, the scope of which is to be determined by the following claims:

I claim:

1. An apparatus for mounting or demounting a vehicle body onto or from a vehicle chassis comprising a platform for supporting said body, means for pivotally connecting said platform to the vehicle chassis, means for rotating said platform about said pivotal connection means, a winch means for controllable moving a vehicle body off of or onto said platform and means for securing the said body to the platform, said winch means comprising a hydraulic cylinder winch having an extendable cylinder shaft and having at either end a set of multiwrap sheaves, and a cable multiwrapped about said sheaves, one end of said cable being secured and the other end being secured and attached to means for removably securing it to the body and wherein said platform comprises a pair of longitudinal beams in spaced relationship, each of said beams being provided along its side with a support means having located therein in substantially parallel and proximal relationship with its respective beam a said hydraulic cylinder winch thereby defining a relatively small longitudinal cavity extending between said beam, support and winch, one of the sets of sheaves being stationary and the other set of said sheaves being connected to the extendable cylinder shaft, each of said cylinder winches having its own cable, a substantial portion of the last length of the cable being located within said cavity thereby to act as a protective shield in the event of cable breakage.

2. An apparatus according to claim 1 which further includes guide means for said extendable cylinder shafts.

3. An apparatus according to claim 2 wherein each of said sheaves connected to said hydraulic cylinder shaft is provided with an axis pin, said guide means includes a guide groove extending in the direction of mounting and demounting and one end of said axis pin slidably resides in said guide groove.

4. An apparatus according to claim 2 wherein the forward side portions of said longitudinal beams have extending therefrom body retaining means.

5. An apparatus according to claim 2 wherein said means for pivotally connecting the platform to the chassis includes a pivot pin and shaft located toward the rearward portion of said platform such that when said platform is pivoted to its full height the rearward ends of said longitudinal beams are adjacent the ground surface.

6. An apparatus according to claim 5 wherein when said platform is pivoted to its full height the rearward ends of said longitudinal beams are a few inches above the ground surface.

7. An apparatus according to claim 2 wherein said means for rotating said platform about said pivotal connection means includes a hydraulic hoist.

8. An apparatus for mounting or demounting a vehicle body onto or from a vehicle chassis comprising a platform for supporting said body, means for pivotally connecting said platform to the vehicle chassis, means for rotating said platform about said pivotal connection means, a winch means for controllably moving a vehicle body off of or onto said platform, and means for securing the said body to the platform, said winch means comprising a hydraulic cylinder winch having an extendable cylinder shaft and having at either end a set of multiwrap sheaves, and a cable multiwrapped about said sheaves, one end of said cable being secured and the other end being attached to means for removably securing it to the body; wherein said platform comprises a pair of longitudinal beams in spaced relationship, each of said beams being provided along its side with a support means having located thereon a said hydraulic cylinder winch, one of the sets of sheaves being stationary and the other set of said sheaves being connected to the extendable cylinder shaft; and wherein said support means is attached to the outboard side of the beam and said extendable cylinder shafts are extendable in the direction of mounting.

9. An apparatus according to claim 8 wherein said stationary sheaves have one less wrap of cable than said sheaves connected to the extendable cylinder shaft, said cable being initially attached at a point adjacent said stationary sheaves and extending therefrom on the outboard side of said winch, the final length of said cable extending from said sheave connected to the extendable cylinder shaft and through a space defined between its respective adjacent beam and winch.

10. An apparatus according to claim 9 wherein a protective cover is provided for said winches, said cover having walls which extend along the outboard side and top of said winch.

11. An apparatus according to claim 10 wherein said securing means is a hydraulically operated locking means.

12. An apparatus according to claim 10 wherein said cover extends along a substantial distance of said longitudinal beams thereby to act as a protective shield in the event of cable breakage.

13. In the combination of a vehicle body and a chassis and apparatus for mounting and demounting the body onto or from the chassis, the improvement comprising as said apparatus for mounting and demounting the body, the apparatus of claim 3.

14. The combination according to claim 13 wherein said body is provided with a pair of long sills and means attached to said long sills for sliding said body along said platform and wherein said platform comprises a pair of longitudinal beams aligned in proximal sliding relation with the means attached to said long sills for sliding said body therealong.

15. The combination according to claim 14 wherein said means attached to said long sills comprises an "L" shaped beam of a thickness and elevated to a height sufficient to prevent said long sills from contacting said chassis during sliding.

16. The combination according to claim 15 wherein said long sills are located under said body and said "L" shaped beam is curved upwardly along the front face of the body after emerging from thereunder.

17. The combination according to claim 14 wherein said long sills are provided at their forward end with a locking groove and said longitudinal beams have extending outwardly from their outboard surface a locking pin so located that when the body is fully mounted on the platform the locking groove engages its respective locking pin.

18. The combination according to claim 17 wherein said platform is pivoted at the rear of the chassis, said longitudinal beams of said platform extending rearwardly of the pivot a distance sufficient such that when said platform is in its elevated position the ends of said beams are not more than a few inches from the ground surface.

19. The combination according to claim 18 wherein said pivot means extend laterally of said chassis and between said pair of longitudinal beams.

20. The combination according to claim 14 wherein said winch means comprises a pair of said hydraulic cylinder winches, one located on the outboard side of each of said pair of longitudinal beams, said winches being attached to said long beams at a spaced distance sufficient to allow said cable and a body long sill to reside therebetween.

21. The combination according to claim 20 wherein said cylinders extend in the direction of loading.

22. The combination according to claim 21 wherein the rearward set of sheaves is stationary and the forward set of sheaves provided at the extendable end of the cylinder is aligned with guide means extending longitudinally of said beams and adjacent thereto, said cable being secured at a location proximal said rearward sheave, extending initially outboard of said sheaves to its first wrap about said forward sheave and terminating at said body in a length that extends between said winch and said longitudinal beams.

23. The combination according to claim 22 wherein said cable wraps said forward sheaves at least three times and said rearward sheaves at least twice.

24. The combination according to claim 20 wherein said winches are enclosed in a protective cover comprised of walls which extend along the outboard side and top of said winch.

25. The combination according to claim 24 wherein said protective cover extends along a substantial distance of said longitudinal beams thereby to act as a protective shield in the event of cable breakage.

26. An apparatus for mounting or demounting a vehicle body onto or from a vehicle chassis comprising a platform for supporting said body, means for pivotally connecting said platform to the vehicle chassis, means for rotating said platform about said pivotal connection means, a winch means for controllably moving a vehicle body off of or onto said platform means for securing the said body to the platform, said winch means comprising a hydraulic cylinder winch having an extendable cylinder shaft and having at either end a set of multi-wrap sheaves, and a cable multiwrapped about said sheaves, one end of said cable being secured and the other end being attached to means for removably securing it to the body, said platform comprising a pair of longitudinal beams in spaced relationship each of said beams being provided along its side with a support means having located therein a said hydraulic cylinder winch, one of the sets of sheaves being stationary and the other set of said sheaves being connected to the extendable cylinder shaft, said means for securing the said body to the platform includes a pair of extendable and retractable locking arms which when extended protrude outwardly through said longitudinal beams a sufficient distance to reside in a portion of said body and a hydraulic means for extending and retracting said arms which comprises a floating hydraulic cylinder, means connecting said arms to the hydraulics of the cylinder, means for guiding said arms during travel, and means for limiting the distance of extension and retraction of said arms.

27. An apparatus according to claim 26 wherein said guide means for said arms includes a conduit extending through said longitudinal beams and wherein said limiting means includes a groove means in the walls of said conduits and a pin means radially extending from said arms and slidably residing in said grooves.

28. In the combination of a vehicle body and a chassis and apparatus for mounting and demounting the body onto or from the chassis, the improvement comprising as said apparatus for mounting and demounting the body, the apparatus of claim 16.

29. The combination according to claim 28 wherein said body includes long sill members, and said guide means for said arms includes a conduit extending through said longitudinal beams, and a conduit located in the long sill members of the body and wherein said limiting means includes a groove means in the walls of said conduits extending through said beams and a pin means radially extending from said arms and slidably residing in said grooves.

* * * * *